United States Patent
Kurosawa

(10) Patent No.: US 10,250,860 B2
(45) Date of Patent: Apr. 2, 2019

(54) ELECTRONIC APPARATUS AND IMAGE DISPLAY METHOD

(71) Applicant: Alpine Electronics, Inc., Tokyo (JP)

(72) Inventor: Takeshi Kurosawa, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 15/228,335

(22) Filed: Aug. 4, 2016

(65) Prior Publication Data

US 2017/0085847 A1    Mar. 23, 2017

(30) Foreign Application Priority Data

Sep. 17, 2015    (JP) ................. 2015-183592

(51) Int. Cl.
| | | |
|---|---|---|
| *H04N 9/31* | (2006.01) | |
| *B60K 35/00* | (2006.01) | |
| *G02B 27/01* | (2006.01) | |

(52) U.S. Cl.
CPC .......... *H04N 9/3185* (2013.01); *B60K 35/00* (2013.01); *G02B 27/0101* (2013.01); *B60K 2350/2052* (2013.01); *G02B 2027/0165* (2013.01); *G02B 2027/0183* (2013.01); *G02B 2027/0185* (2013.01)

(58) Field of Classification Search
None
See application file for complete search history.

(56) References Cited

U.S. PATENT DOCUMENTS

| | | | | |
|---|---|---|---|---|
| 5,013,135 | A  * | 5/1991 | Yamamura | ............... G02B 3/08 340/980 |
| 2003/0063264 | A1* | 4/2003 | Watanabe | .......... G03B 21/2053 353/97 |
| 2005/0154505 | A1* | 7/2005 | Nakamura | ........... G01C 21/365 701/1 |
| 2014/0125085 | A1  | 5/2014 | Wakibayashi et al. | |
| 2014/0268353 | A1* | 9/2014 | Fujimura | ........... G02B 27/0101 359/630 |
| 2015/0268466 | A1  | 9/2015 | Kanamori | |
| 2016/0004076 | A1* | 1/2016 | Matsubara | ......... G02B 27/0101 345/7 |
| 2016/0178902 | A1* | 6/2016 | Ando | .................... B60K 35/00 348/115 |

FOREIGN PATENT DOCUMENTS

| | | |
|---|---|---|
| JP | 2009-250919 A | 10/2009 |
| JP | 2014-91466 | 5/2014 |
| JP | 2014-142474 A | 8/2014 |
| WO | WO 2015/072013 A1 | 5/2015 |

OTHER PUBLICATIONS

Notification of Reasons for Refusal for Japanese Patent Application No. 2015-183592 dated Dec. 19, 2018; 17 pages.

* cited by examiner

*Primary Examiner* — Samira Monshi
(74) *Attorney, Agent, or Firm* — Brinks Gilson & Lione

(57) ABSTRACT

A vehicle-mounted apparatus includes a cluster display unit attached to an instrument panel and a HUD. The vehicle-mounted apparatus determines a running state of the vehicle and adjusts the focal length in the HUD such that the position of a virtual image of a projected image is near the cluster display unit or is a forward position on the windshield.

17 Claims, 9 Drawing Sheets

| DISTANCE TO DESTINATION | FOCAL LENGTH IN HUD |
|---|---|
| D2 < DISTANCE | F4 |
| D1 < DISTANCE ≤ D2 | F3 |
| 0 m < DISTANCE ≤ D1 | F2 |
| 0 m | F1 |

ELECTRONIC APPARATUS AND IMAGE DISPLAY METHOD

RELATED APPLICATION

The present application claims priority to Japanese Patent Application Number 2015-183592, filed Sep. 17, 2015, the entirety of which is hereby incorporated by reference.

BACKGROUND

1. Field

The present disclosure relates to an electronic apparatus that has the function of projecting images and, in particular, to adjustment of a focal length of a projected image.

2. Description of the Related Art

A method for projecting images in the direction of a driver's line of sight has been known as a display system that reduces motion of the driver's line of sight while driving the vehicle. This kind of display system is also called head up display (hereinafter, abbreviated as HUD). The HUD is a system that forms an image from an image projecting device placed in a vehicle on a windshield or a screen on the windshield and thus creates a virtual image that enables an object to seem to exist in a real space through the screen. The driver can reduce the number of times that they look at a display device or the like inside the vehicle by viewing the virtual image through the screen.

While the HUD is becoming widespread, meters (for example, speed meter, gear position indicator, fuel gauge, and similar instruments) attached to an instrument panel in front of the driver's seat are being displayed in an electronic digital form. Those meters may be displayed by, for example, a single horizontally long liquid crystal display unit. Hereinafter, a unit that electronically displays the meters on the instrument panel is referred to as a cluster display unit. When the HUD and the cluster display unit are both placed in the vehicle, the driver can switch between the HUD and the cluster display unit depending on the state, such as during movement or at a standstill. Japanese Unexamined Patent Application Publication No. 2014-91466 discloses a vehicle information display device including both a HUD and a cluster display unit. In that vehicle information display device, a dedicated HUD display area is provided at an upper portion of the cluster display unit to minimize motion of a driver's line of sight and changes in a focal point.

When an image displayed by the cluster display unit and an image displayed by the HUD cooperate with each other, the driver must look at each indication by the cluster display unit and that by the HUD. In that case, because the cluster display unit is in a position relatively near to the driver's seat, and the image displayed by the HUD is typically a virtual image in the distance on the windshield as seen from the driver's seat, the focal lengths of both images are not the same in most cases. Accordingly, if the driver tries to move the line of sight between both images, they must readjust the focus for each movement, and this leads to reduced visibility. There is a method of making both focal lengths uniform by providing a dedicated HUD display area at an upper portion of a cluster display unit, as illustrated in the above-mentioned patent literature. In that case, however, it is difficult to achieve depth in images displayed by the HUD.

SUMMARY

The present disclosure is directed to solving the above-described problems. It is an object of the present disclosure to provide an electronic apparatus, image display method, and image display program capable of making images by projection easily visible.

An electronic apparatus according to a first aspect of the present disclosure includes display means, projecting means, determining means, and adjusting means. The display means is configured to display a first image. The projecting means is capable of displaying a virtual image of a second image at least in a first position near the display means or in a second position distant therefrom on a windshield of a vehicle by adjusting a focal length. The determining means is configured to determine whether the virtual image of the second image is to be displayed in the first position or in the second position. The adjusting means is configured to adjust the focal length in the projecting means on the basis of the determination by the determining means.

Preferably, the determination by the determining means may be based on a running state of the vehicle. Preferably, the determining means may determine that the virtual image is to be displayed in the first position when the vehicle is at a standstill, and may determine that the virtual image is to be displayed in the second position when the vehicle is moving. Preferably, the electronic apparatus may further include cooperation determining means configured to determine whether the projecting means is to cooperate with the display means, and the adjusting means may adjust the focal length when it is determined that the projecting means is to cooperate. Preferably, the cooperation determining means may determine whether the presence or absence of the cooperation on the basis of correlation between the first image and the second image. Preferably, the first image and the second image may have correlation with each other when at least part of the first image is common to the second image. Preferably, the at least part of the first image may be traffic information. Preferably, the determination by the determining means may be based on at least one of a content of the first image and a content of the second image. Preferably, the determining means may determine that the virtual image is to be displayed in the first position when the second image has a content relating to arrival at a destination. Preferably, the determining means may determine that the virtual image is to be displayed in the second position when the second image has a content relating to guidance on a next intersection. Preferably, the determining means may determine that the virtual image is to be displayed in the first position when the first image has a content relating to information of an obtained image of surroundings of the vehicle. Preferably, the second image may be a warning about an obstacle around the vehicle when the first image has the content relating to information on the obtained image of surroundings of the vehicle. Preferably, the display means may be attached to an instrument panel in front of a driver's seat.

An image display method according to a second aspect of the present disclosure is for use in an electronic apparatus. The electronic apparatus includes display means configured to display a first image and projecting means capable of displaying a virtual image of a second image at least in a first position near the display means or in a second position distant therefrom on a windshield of a vehicle by adjusting a focal length. The image display method includes a step of determining whether the virtual image of the second image is to be displayed in the first position or in the second position and a step of adjusting the focal length in the projecting means on the basis of the determination.

According to the present disclosure, because the virtual image of the second image by the projecting means can be displayed in the first position or in the second position, the first image by the display means and the virtual image of the second image by the projecting means are easily visible.

DETAILED DESCRIPTION

An example of an electronic apparatus according to the present disclosure may be a vehicle-mounted apparatus. In preferred embodiments, the electronic apparatus includes a cluster display unit attached to an instrument panel and a head up display (HUD) configured to display a virtual image of an image by a projection system. The electronic apparatus can be a computer apparatus or computer system that processes various kinds of data. It can process input data and output information to the above-described cluster display unit and HUD. The electronic apparatus can encompass various functions. For example, the electronic apparatus can have a navigation function, a function of reproducing audio data and video data, and a function of receiving television broadcasting and radio broadcasting.

In the embodiments of the present disclosure, the HUD can change the focal length of a projected image and can change the position of a virtual image of the projected image by adjusting the focal length. In preferred embodiments, the virtual image is projected such that the image seems in a distant position on a windshield or in a position at which its focal length is similar to the focal length in the cluster display unit. The focal length is not necessarily similar in a strict sense and is only required to be nearer the focal length in the cluster display unit than that in the distant position. Control for the focal length by the HUD is based on various kinds of information. For example, the focal length, that is, a position of the virtual image, may be adjusted on the basis of a running state of a vehicle, the content of a projected image, or other information. In yet another embodiment, the position of the virtual image can be adjusted on the basis of correlation between the content of an image displayed by the cluster display unit and the content of an image displayed by the HUD.

Embodiments

Figure 1:
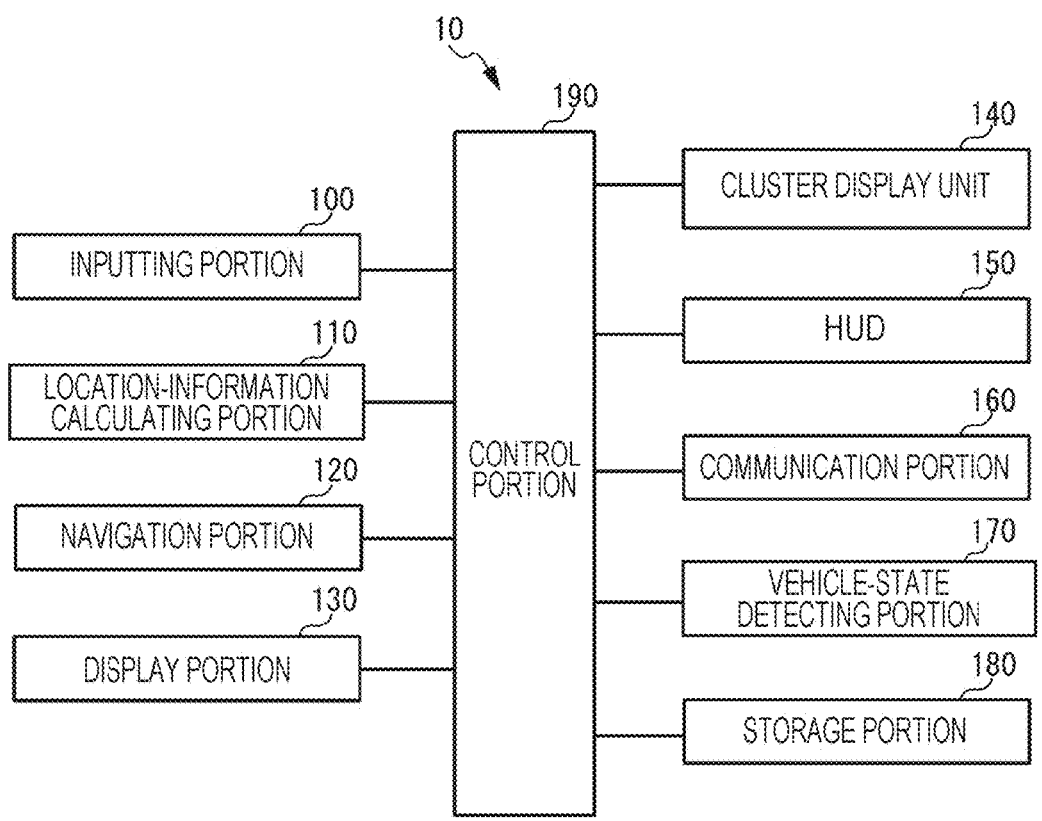
FIG. 1 is a block diagram that illustrates a configuration of a vehicle-mounted apparatus according to a first embodiment of the present disclosure.

Next, a first embodiment of the present disclosure is described. FIG. 1 is a block diagram that illustrates a configuration of a vehicle-mounted apparatus 10 according to the first embodiment. The vehicle-mounted apparatus 10 includes an inputting portion 100, a location-information calculating portion 110, a navigation portion 120, a display portion 130, a cluster display unit 140, a HUD 150, a communication portion 160, a vehicle-state detecting portion 170, a storage portion 180, and a control portion 190. This configuration is merely an example, and may further include a reproducing portion configured to reproduce data recorded on a compact disk (CD) or a digital versatile disk (DVD) and a receiving device configured to receive radio broadcasting and television broadcasting.

The inputting portion 100 receives an instruction from a user through an input key device, a voice input recognition device, a touch screen, or other device and supplies it to the control portion 190. For example, when the navigation portion 120 is activated, the user can set a destination by using the inputting portion 100. The location-information calculating portion 110 calculates a current location of the vehicle on the basis of global positioning system (GPS) signals transmitted from GPS satellites and outputs from a gyroscope sensor and an acceleration sensor mounted on the vehicle. The navigation portion 120 searches for a route to the destination and provides guidance on the route to the destination and the like.

Figure 2:
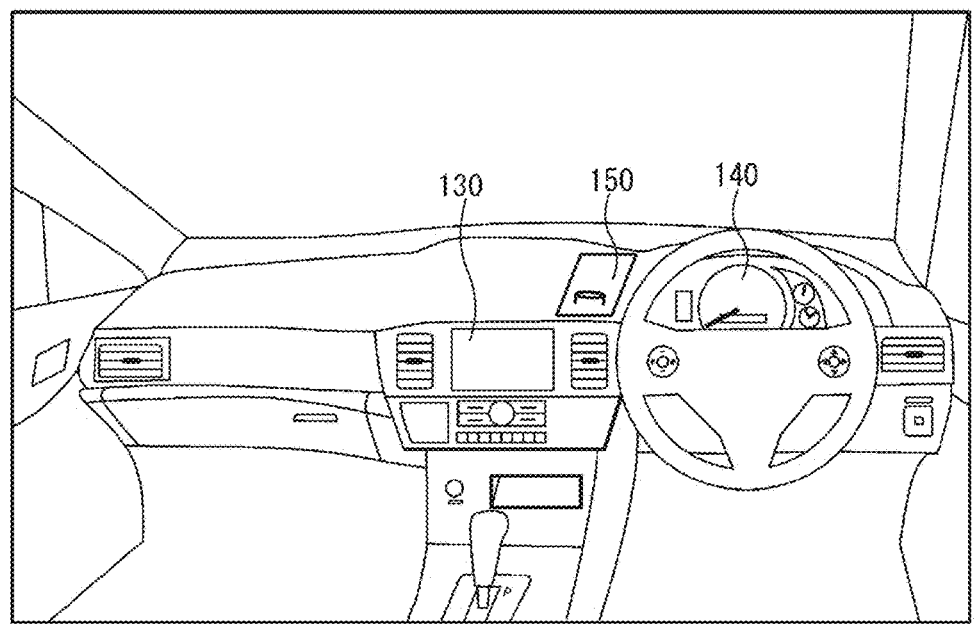
FIG. 2 illustrates an example of a cluster display unit and other portions disposed inside a vehicle.

The display portion 130 displays a road map and other information generated by the navigation portion 120. An example of the display portion 130 may be disposed as part of a central panel between the driver's seat and passenger seat, as illustrated in FIG. 2. The display portion 130 may include a liquid crystal display having the touch-screen function or other display device.

The cluster display unit 140 is disposed on an instrument panel in front of the driver's seat and displays images of meters and the like. The cluster display unit 140 may display images of the meters, such as a speed meter, tachometer, odometer, and fuel gauge, images of the open or closed states of the doors, and images of the direction indicator, and may further display images relating to navigation, which are described below, and images of surroundings of the location of the vehicle.

Figure 3:
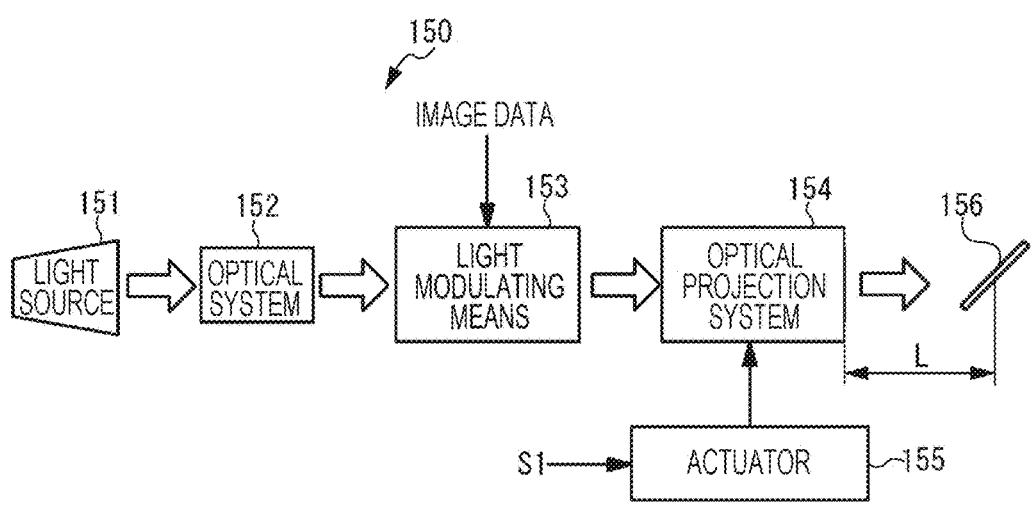
FIG. 3 is a block diagram that illustrates a general configuration of a HUD portion.

The HUD 150 projects an image on a windshield or a screen on the windshield. FIG. 3 is a block diagram that illustrates an example of a configuration of the HUD 150. The HUD 150 includes a light source 151, an optical system 152, light modulating means 153, an optical projection system 154, and an actuator 155. Examples of the light source 151 may include a halogen lamp, a light emitting diode array, and a laser diode array. The optical system 152 converges light from the light source 151 and supplies light of a predetermined aspect ratio to the light modulating means 153. Examples of the light modulating means 153 may include a liquid-crystal device, and a digital mirror device in which a plurality of deformable mirrors are two-dimensionally arranged. The light modulating means 153 drives the liquid-crystal device or digital mirror device on the basis of image data supplied from the control portion 190 or other portion and spatially modulates the light incident from the optical system 152. The optical projection system 154 projects the light modulated by the light modulating means 153 in a direction toward a windshield 156 or a screen on the windshield.

The actuator 155 includes a driving mechanism (e.g., motor) for making the focal length or the like in the optical projection system 154 variable. The actuator 155 adjusts the focal length in the optical projection system 154 on the basis of a control signal S1 from the control portion 190. Although a physical length L from the optical projection system 154 to the screen (windshield) 156 is constant, the actuator 155 can adjust the optical length and adjust the focal length in the optical projection system 154 by moving the position of a lens or prism or the like included in the optical projection system 154. By adjustment of the focal length, the size and position of an image projected on the screen are changed.

The communication portion 160 enables communications with external equipment and a cloud server wirelessly or through wire. For example, an image downloaded from the cloud server can be displayed by the display portion 130, cluster display unit 140, or HUD 150.

The vehicle-state detecting portion 170 detects the running state of the vehicle. For example, the vehicle-state detecting portion 170 can obtain information on the speed, the right or left turn state, gear position, and the like through an internal bus in the vehicle. The vehicle-state information detected by the vehicle-state detecting portion 170 is supplied to the control portion 190. The control portion 190 employs the vehicle-state information in adjustment of the focal length in the HUD.

The storage portion 180 can store application software executable by the vehicle-mounted apparatus 10, programs executable by the control portion 190, and other various kinds of data. For example, the storage portion 180 can store map data required when the navigation portion 120 is activated. It can also store image data to be supplied to the display portion 130, cluster display unit 140, and HUD 150. In preferred embodiments, the control portion 190 may include a microcontroller including a read-only memory (ROM), random-access memory (RAM), or the like. The ROM or RAM can store various programs for controlling operations of components in the vehicle-mounted apparatus 10. In the first embodiment, the control portion 190 executes a display control program 200 for controlling the focal length in the HUD 150.

Figure 4:
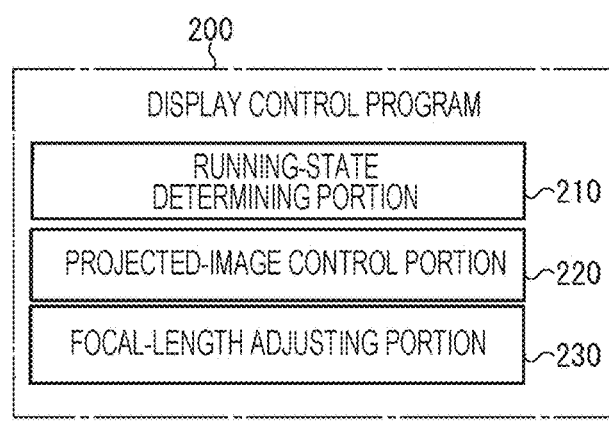
FIG. 4 illustrates an example of a functional configuration of a display control program according to the first embodiment of the present disclosure.

FIG. 4 illustrates an example of a functional configuration of a display control program according to the first embodiment. The display control program 200 includes a running-state determining portion 210, a projected-image control portion 220, and a focal-length adjusting portion 230.

The running-state determining portion 210 determines the running state of the vehicle on the basis of information detected through the vehicle-state detecting portion 170. Specifically, it can determine whether the vehicle starts moving, is moving, is at a standstill, moves backward, turns right or left, or is in another state on the basis of information on the gear position and information on the speed of the vehicle. The determination by the running-state determining portion 210 is supplied to the projected-image control portion 220 and focal-length adjusting portion 230.

The projected-image control portion 220 determines an image to be projected by the HUD 150 on the basis of the determination by the running-state determining portion 210. In the present embodiment, the projected-image control portion 220 performs control such that an image common to an image displayed on the cluster display unit 140 is projected by the HUD 150. Preferably, when it is determined that the vehicle starts moving, that is, the gear position shifts to the drive, the projected-image control portion 220 causes the HUD 150 to display an image of traffic information, and more preferably, causes traffic information displayed on the cluster display unit 140 to move to the HUD 150. The traffic information is information useful for drivers. Examples of the traffic information may include guidance on the next intersection on a route to the destination, a speed limit for the road where the vehicle is running, and guidance on the next lane dedicated to right or left turn. When an image of the traffic information has already been displayed by the HUD 150, the projected-image control portion 220 causes the HUD 150 to continue projecting the image.

The focal-length adjusting portion 230 adjusts the focal length in the HUD 150 on the basis of the determination by the running-state determining portion 210. The focal-length adjusting portion 230 transmits the control signal S1 to the actuator 155 in the HUD 150 and adjusts the focal length in the optical projection system 154. In the present embodiment, when it is determined that the vehicle is at a standstill (the gear is in the parking position or the speed of the vehicle is zero or substantially zero for a certain period of time), the focal-length adjusting portion 230 adjusts the focal length such that the virtual image of the image projected by the HUD 150 is near the cluster display unit 140, with respect to the driver. When it is determined that the vehicle starts moving (the gear position changes from the parking to the drive or the vehicle changes its speed from zero by a certain quantity or more), the focal-length adjusting portion 230 adjusts the focal length such that the virtual image of the image projected by the HUD 150 is in a forward position on the windshield with respect to the driver. In this way, the focal-length adjusting portion 230 adjusts the focal length such that the virtual image can be displayed in at least two positions: a position near the cluster display unit 140; and, a forward position on the windshield. The focal length is not limited to those two positions. For example, the focal-length adjusting portion 230 may continuously adjust the focal length such that the position where the virtual image appears becomes farther away in proportion to the speed of the vehicle. The focal-length adjusting portion 230 may adjust the angle of projection as needed.

Figure 5A:
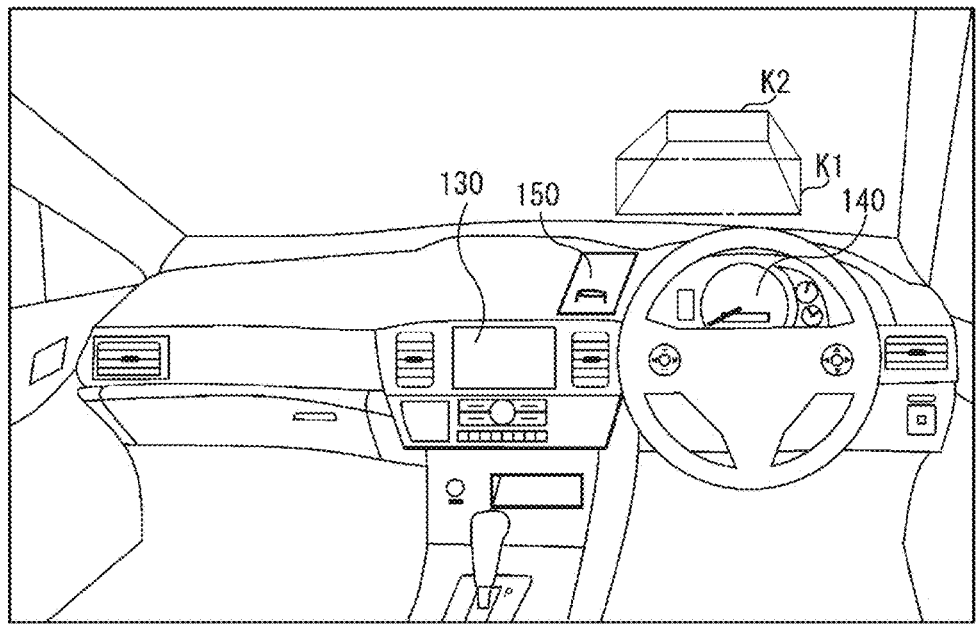
FIG. 5A schematically illustrates how virtual images of projected images are viewed from a driver's seat, and FIG. 5B schematically illustrates how the virtual images are viewed in a lateral direction.
Figure 5B:
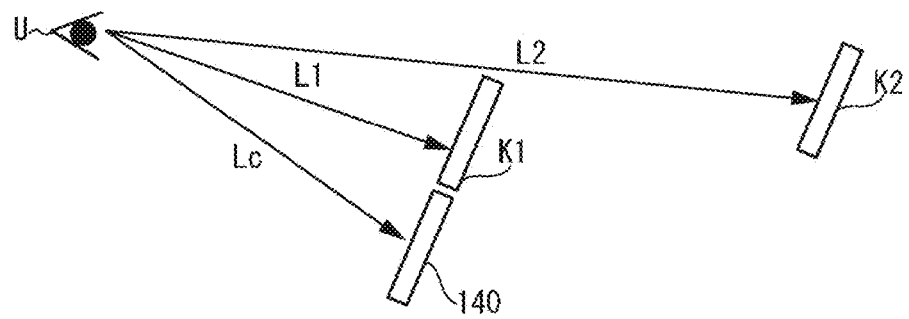

FIG. 5A schematically illustrates how virtual images of images projected by the HUD 150 are viewed from the driver's seat toward the direction of the windshield. FIG. 5B schematically illustrates, in a lateral direction, how the virtual images are viewed. When it is determined that the vehicle is at a standstill, the focal-length adjusting portion 230 adjusts the focal length such that a relatively large image is projected on the windshield and the virtual image K1 is created in a position near the cluster display unit 140, that is, in a position similar to a position where the cluster display unit 140 is viewed for the driver (L1≅Lc, where L1 is the length to the virtual image K1 and Lc is the length from the position of the eyes of a driver U to the cluster display unit 140). When it is determined that the vehicle starts moving or is moving, the focal-length adjusting portion 230 adjusts the focal length such that a relatively small image is projected on the windshield. More preferably, the relatively small image may be positioned somewhat above the relatively large image, and the direction of the line of sight of the driver is changed to an angle when they look farther away than when they look closer to the vehicle. In this way, a virtual image K2 of the projected image is created in a position farther than the cluster display unit 140, that is, in a position similar to a position viewed when the driver looks frontward while the vehicle is moving (L2>L1, where L2 is the length from the position of the eyes of the driver U to the virtual image K2). In the case where the focal-length adjusting portion 230 can continuously adjust the focal length (has the zoom-in/zoom-out function), the virtual image K2 may gradually become more distant in accordance with an increase in speed. When the vehicle changes its state from moving to standstill, the focal-length adjusting portion 230 adjusts the focal length of the projected image such that the displayed image changes from the position of the virtual image K2 to that of the virtual image K1, in contrast to the above-described adjustment.

Figure 6:
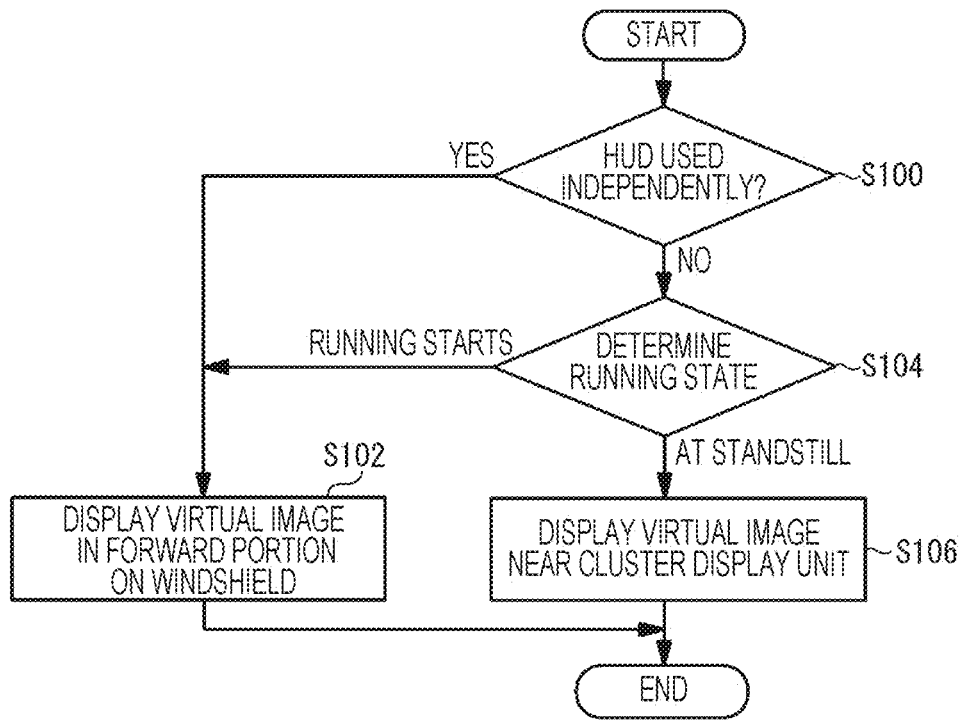
FIG. 6 is a flowchart that illustrates a display control operation according to the first embodiment of the present disclosure.

Next, a displaying operation in the vehicle-mounted apparatus in the present embodiment is described with reference to the flowchart in FIG. 6. First, the projected-image control portion 220 determines whether the HUD 150 is used independently (S100). This is determined by whether the image displayed by the cluster display unit 140 contains traffic information. When the cluster display unit 140 displays traffic information, the HUD 150 also displays the traffic information. Thus, the HUD 150 is used in cooperation with the cluster display unit 140. When the cluster display unit 140 does not display traffic information, the HUD 150 is used independently. Whether the HUD is used independently can be determined in other ways. For example, correlation between images projected by the HUD 150 and images displayed by the cluster display unit 140 may be defined in advance, the HUD 150 may be determined as being used independently if they have no correlation, and the HUD 150 may be determined as being used cooperatively if they have the correlation. When the HUD is used cooperatively, the HUD forms a sub screen for the cluster display unit and may exaggerate an image displayed by the cluster display unit 140 or provide supplementary information for that image.

When the HUD 150 is determined as being used independently, the focal-length adjusting portion 230 does not adjust the focal length of the projected image and causes the virtual image K2 to be displayed in a forward position on the windshield (S102). When the HUD 150 is determined as being used cooperatively, the focal-length adjusting portion 230 determines the running state by the running-state determining portion 210 (S104) and adjusts the focal length on the basis of the determination. As previously described, when the vehicle is determined as being at a standstill, the virtual image K1 is displayed near the cluster display unit 140 (S106); when the vehicle is determined to starting moving or already be moving, the virtual image K2 is displayed in a forward position on the windshield (S102).

Figure 7:
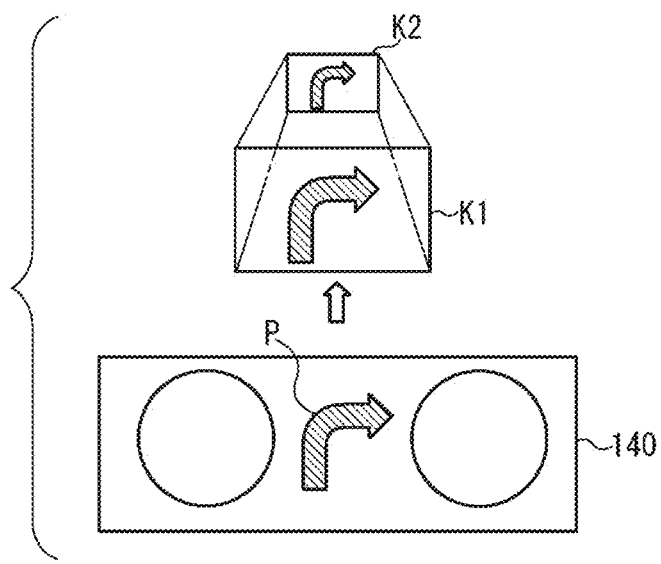
FIG. 7 illustrates a display example of the HUD according to the first embodiment.

FIG. 7 illustrates a display example. In addition to indications of the meters, traffic information P indicating that the vehicle will turn right at the next intersection is displayed on the cluster display unit 140. Thus, the HUD 150 is used in cooperation with the cluster display unit 140. If the HUD 150 has not displayed the traffic information P, the projected-image control portion 220 causes the HUD 150 to display the traffic information P. When the vehicle is at a standstill, the driver can view the virtual image K1 of the projected image by the HUD 150 in a position similar to the position of the cluster display unit 140. Thus, when they try to obtain information by moving the line of sight between the cluster display unit 140 and the projected image by the HUD 150, the necessity of adjustment of the focal point can be eliminated or the adjustment can be minimized, and they can view each indication easily. When the gear is shifted to the drive (D) and the vehicle starts moving, the driver can view the virtual image K2 in the same position as that viewed when they look at a road or the like frontward through the windshield. In this way, when the HUD 150 is used in cooperation with the cluster display unit 140, because the position of the virtual image can be changed depending on the running state of the vehicle, the driver can easily view the projected image.

Next, a second embodiment of the present disclosure is described. The first embodiment illustrates an example in which the focal length in the HUD 150 is adjusted depending on the running state of the vehicle. The second embodiment illustrates an example in which the focal length is adjusted on the basis of cooperation with the navigation portion 120.

Figures 8, 9:
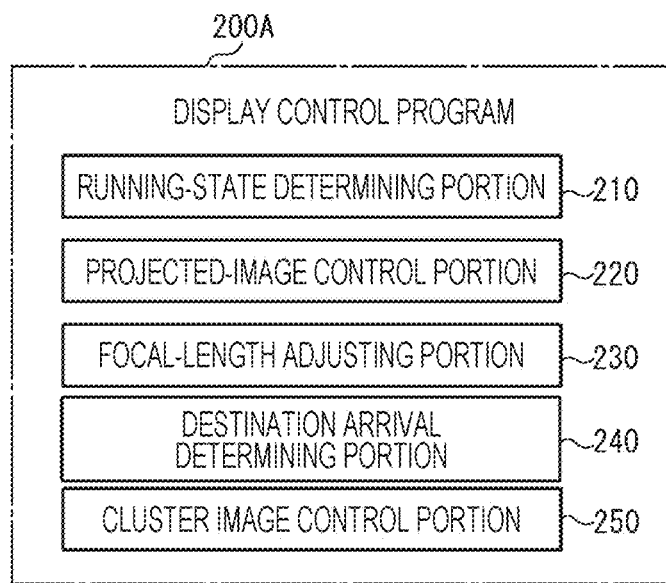
FIG. 8 illustrates an example of a functional configuration of a display control program according to a second embodiment of the present disclosure.
FIG. 9 illustrates an example of a table that defines a relationship between a remaining distance to a destination and a focal length.

FIG. 8 illustrates an example of a functional configuration of a display control program 200A according to the second embodiment. The display control program 200A includes a destination arrival determining portion 240 and a cluster image control portion 250, in addition to the configuration in the first embodiment. When a destination is input by a user, the navigation portion 120 searches for the optimal route to the destination and provides guidance on the retrieved route. When the guidance on the retrieved route is provided, the destination arrival determining portion 240 determines the remaining distance or remaining time to the destination, it supplies the determination to the projected-image control portion 220, focal-length adjusting portion 230, and cluster image control portion 250. When the destination arrival determining portion 240 determines that the destination is reached, the cluster image control portion 250 causes the cluster display unit 140 to display information about the destination. If the navigation portion 120 includes the destination arrival determining portion 240, the display control program 200A may receive the determination by the destination arrival determining portion 240 from the navigation portion 120.

In the second embodiment, the focal-length adjusting portion 230 can adjust the focal length in the optical projection system in the HUD 150 such that the position of the virtual image changes in accordance with the distance to the destination. That is, the focal-length adjusting portion 230 adjusts the focal length of the projected image such that the position of the virtual image gradually comes nearer with a reduction in the distance to the destination. Finally, when it is determined that the destination is reached, the focal-length adjusting portion 230 adjusts the focal length such that the virtual image K1 is near the cluster display unit 140. Preferably, the focal-length adjusting portion 230 may store a table that defines a relationship between the remaining distance to the destination and the focal length in advance, as illustrated in FIG. 9, and may adjust the focal length by referring to the table.

When the destination arrival determining portion 240 determines that the destination is reached, the cluster image control portion 250 causes the cluster display unit 140 to display information about the destination. For example, when the destination is a facility, the cluster image control portion 250 reads information about the facility (e.g., open and closing time of the facility, presence or absence of a parking lot), an external view photograph of the facility, and the like from the storage portion 180 and causes the cluster display unit 140 to display them.

Figure 10:
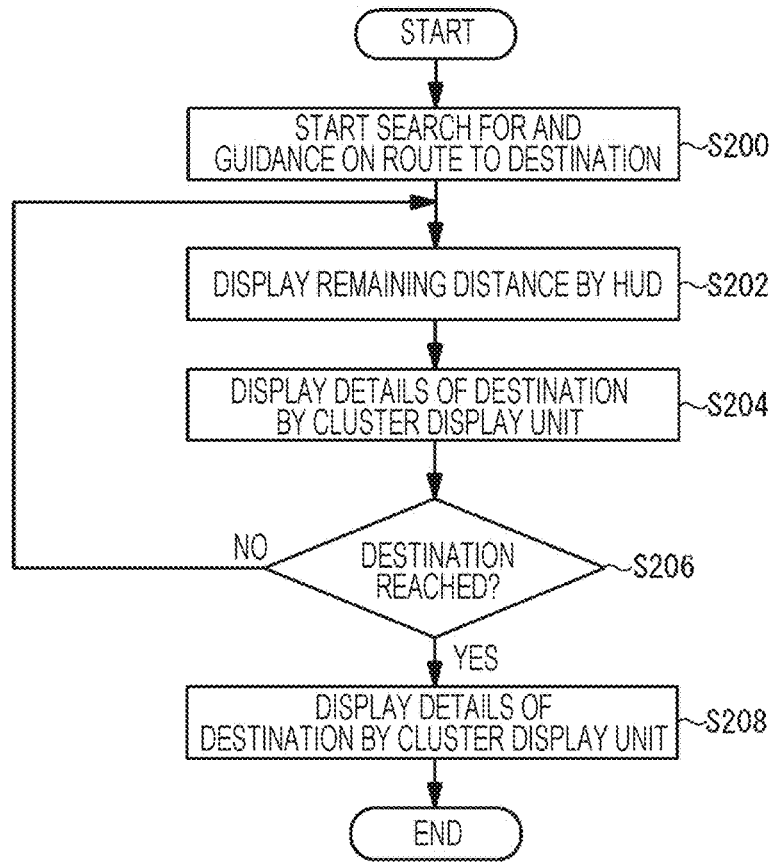
FIG. 10 is a flowchart of a display control operation according to the second embodiment of the present disclosure.

Next, operations in the second embodiment are described with reference to the flowchart in FIG. 10. When the navigation portion 120 is activated and a destination is set, a route to the destination is retrieved and guidance on the route starts (S200). The projected-image control portion 220 causes the HUD 150 to display the remaining distance to the destination without a break (S202). In that case, like in the first embodiment, the focal-length adjusting portion 230 may adjust the focal length such that the remaining distance is displayed in the position of the virtual image K2 during the running and in the position of the virtual image K1 during the standstill. As described in the first embodiment, in the case where traffic information, such as guidance on an intersection, is displayed by the cluster display unit 140, the HUD 150 can display the traffic information by being used as the sub screen.

Figure 11:
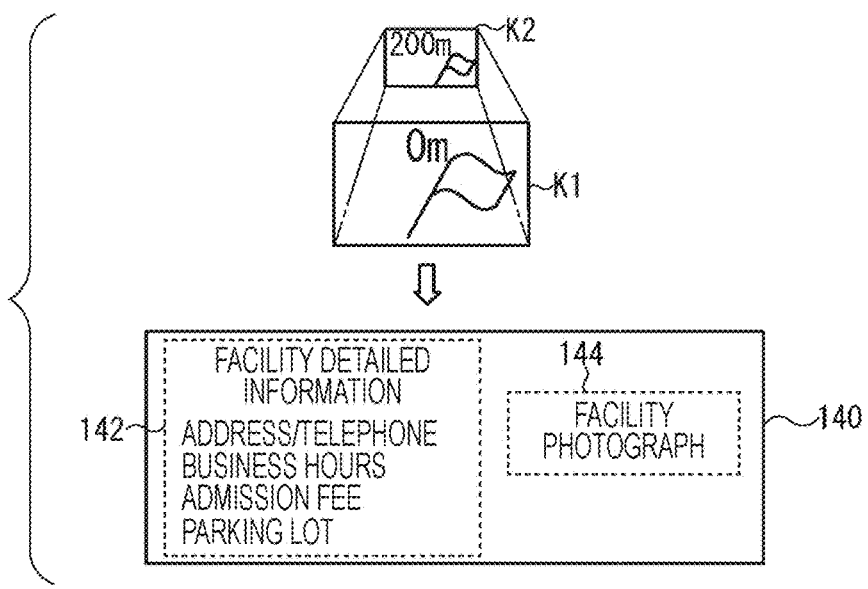
FIG. 11 illustrates a display example according to the second embodiment of the present disclosure.

The focal-length adjusting portion 230 can adjust the focal length such that the virtual image of the projected image by the HUD is near the cluster display unit 140 on the basis of, for example, the table illustrated in FIG. 9 (S204). Then, when the destination arrival determining portion 240 determines that the destination is reached (S206), the cluster image control portion 250 causes the cluster display unit 140 to display detailed information on the destination (S208). FIG. 11 illustrates a display example according to the second embodiment. When the virtual image K2 indicating the remaining distance to the destination is displayed while the vehicle is running and then it is determined that the destination is reached, the virtual image K1 indicating the remaining distance is displayed near the cluster display unit 140. Facility detailed information 142 and facility external view photograph 144 are displayed on the cluster display unit 140. This enables the driver to easily view the details of the indication by the cluster display unit 140 at the same time when they view the virtual image K1.

Figure 12:
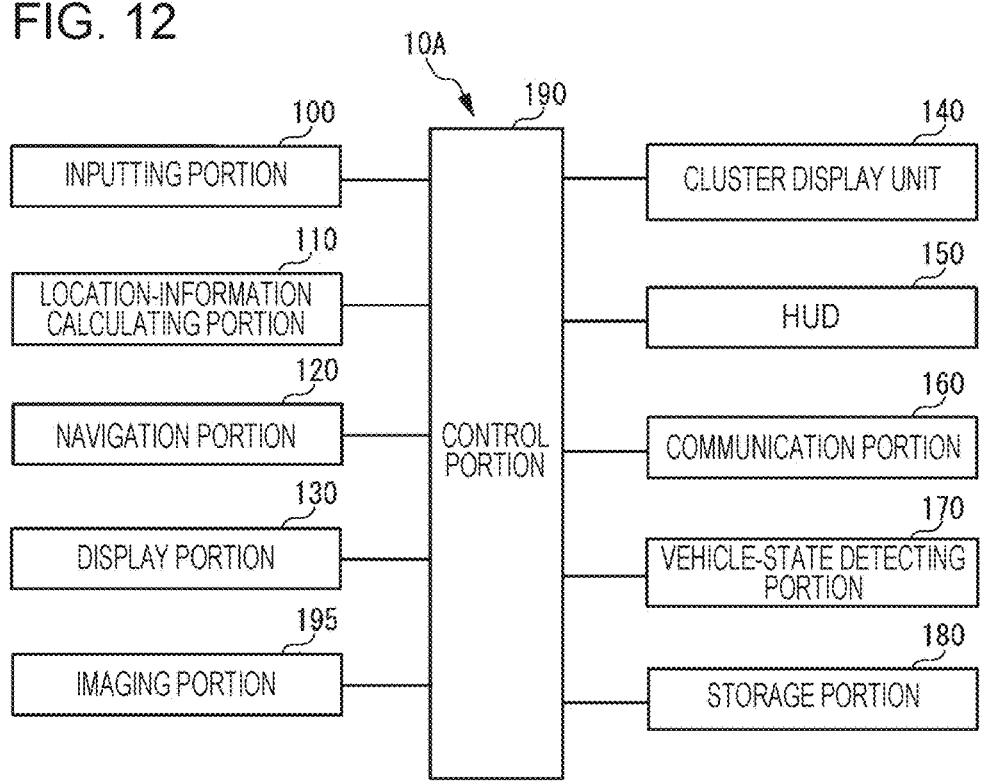
FIG. 12 is a block diagram that illustrates a configuration of a vehicle-mounted apparatus according to a third embodiment of the present disclosure.

Next, a third embodiment of the present disclosure is described. The third embodiment uses the HUD 150 as the sub screen for the cluster display unit 140. FIG. 12 is a block diagram that illustrates a configuration of a vehicle-mounted apparatus 10A according to the third embodiment. The vehicle-mounted apparatus 10A includes an imaging portion 195 configured to obtain an image of surroundings of the vehicle, in addition to the configuration illustrated in the first embodiment. For example, the imaging portion 195 obtains images in four directions of the frontward, backward, and lateral directions and supplies the obtained image data to the control portion 190.

Figure 13:
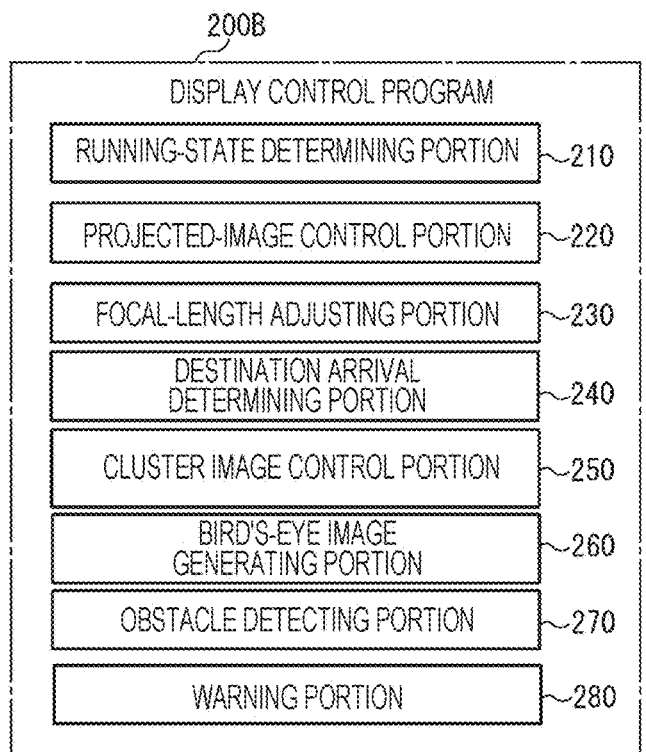
FIG. 13 illustrates an example of a functional configuration of a display control program according to the third embodiment of the present disclosure.

FIG. 13 illustrates an example of a functional configuration of a display control program 200B according to the third embodiment. The display control program 200B includes a bird's eye image generating portion 260, an obstacle detecting portion 270, and a warning portion 280, in addition to the configuration in the first and second embodiments.

The bird's eye image generating portion 260 generates a bird's eye image (top view image) seen from a point immediately above the vehicle on the basis of the obtained image data in the four directions of frontward, backward, and lateral directions obtained by the imaging portion 195. The cluster image control portion 250 causes the cluster display unit 140 to display the generated bird's eye image.

In preferred embodiments, when the running-state determining portion 210 determines that the gear is shifted to reverse, or when an instruction for parking in a garage or for parallel parking is provided from the user, the bird's eye image is displayed.

The obstacle detecting portion 270 detects the presence or absence of an obstacle around the vehicle by performing image processing on the image data obtained by the imaging portion 195. The warning portion 280 outputs a warning when the obstacle detecting portion 270 detects an obstacle around the vehicle. The warning can be made by sound output and image output. In the present embodiment, the projected-image control portion 220 causes the HUD 150 to display a warning. In that case, the focal-length adjusting portion 230 adjusts the focal length in accordance with the running state of the vehicle such that, when the vehicle reverses or moves at a certain speed or less, the virtual image K1 of the warning is displayed near the cluster display unit 140, as in the case of the first embodiment. The image of the warning may be a prepared image in the storage portion 180.

Figure 14:
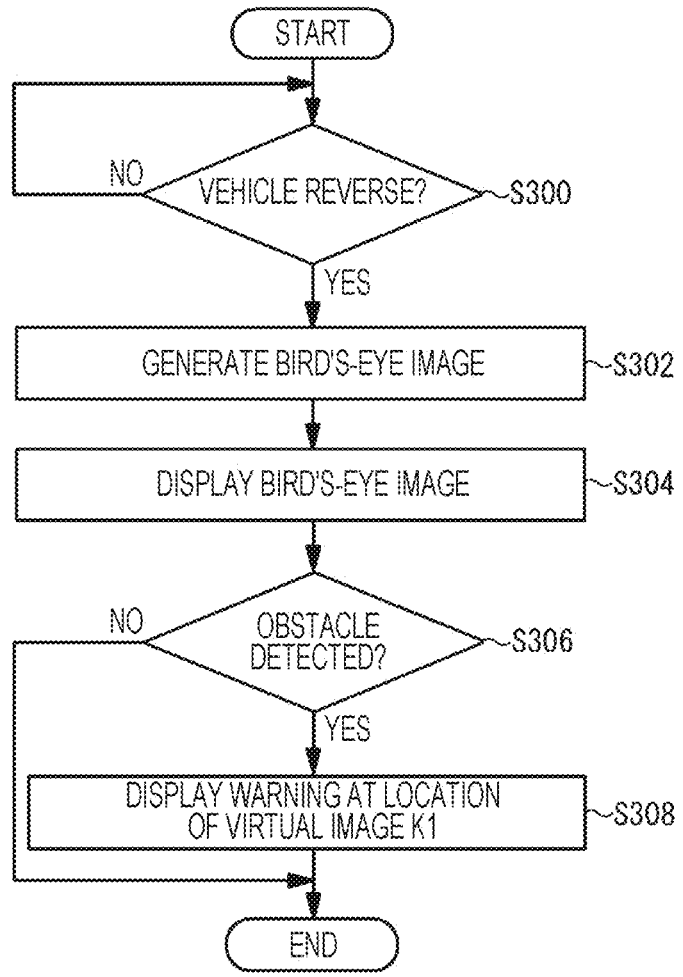
FIG. 14 is a flowchart of a display control operation according to the third embodiment of the present disclosure.
Figure 15:
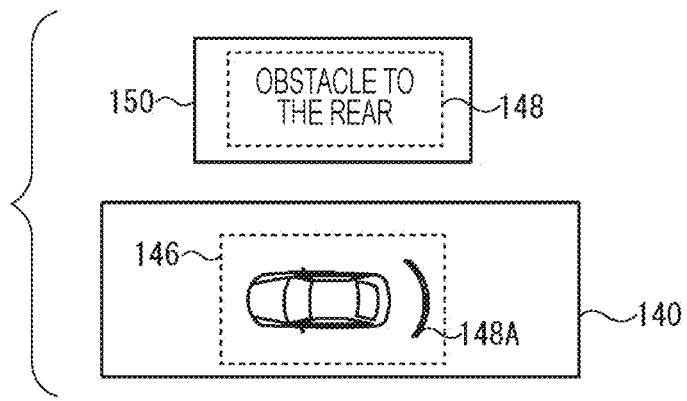
FIG. 15 illustrates a display example according to the third embodiment of the present disclosure.

FIG. 14 is a flowchart of a display control operation according to the third embodiment. First, it is determined whether the vehicle reverses (S300). When it is determined that the vehicle reverses, a bird's eye image is generated on the basis of obtained image data from the imaging portion 195 (S302), and the bird's eye image is displayed on the cluster display unit 140 (S304). For example, a bird's eye image 146 illustrated in FIG. 15 is displayed. Next, the presence or absence of an obstacle around the vehicle is detected on the basis of the obtained image data (S306). When the obstacle is detected, the HUD 150 displays a warning (S308). At this time, the warning is displayed in the position of the virtual image K1. For example, a warning 148 illustrated in FIG. 15 is displayed. A warning 148A may also be displayed on the cluster display unit 140. The driver can observe the warning 148 on the HUD 150 within their field of vision while observing the circumstances around the vehicle on the cluster display unit 140.

Figure 16:
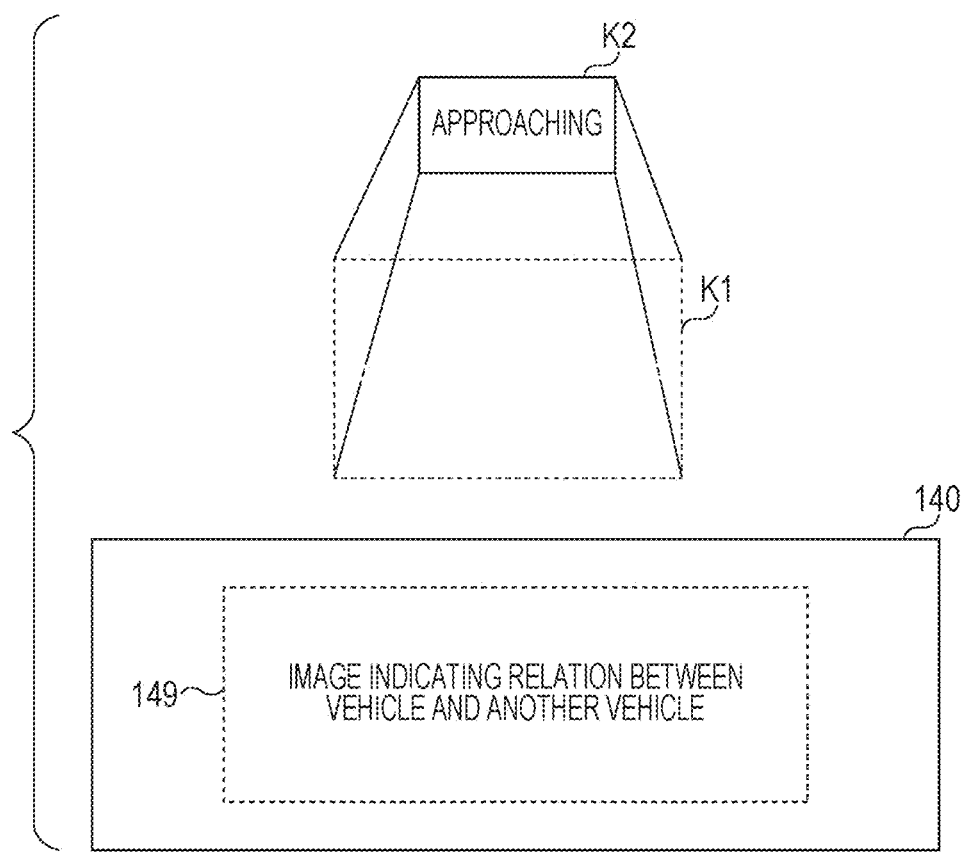
FIG. 16 illustrates an example according to a variation of the third embodiment of the present disclosure.

Next, a variation of the third embodiment is described. FIG. 16 illustrates an example in which the focal length in the HUD 150 is adjusted in the case where the vehicle has an automatic driving function. When another vehicle approaches the vehicle having the automatic driving function, an image revealing a positional relationship between the vehicle and the other vehicle is displayed, for example, when the other vehicle approaches from the rear, an image in which the rear of the vehicle is captured is displayed on the cluster display unit 140 and a warning that the other vehicle is approaching is displayed on the HUD 150. In that case, the focal-length adjusting portion 230 adjusts the focal length of the warning being a projected image such that the virtual image K2 of the warning is displayed in a forward position on the windshield while the vehicle is moving, as in the case of the first embodiment.

The preferred embodiments of the present disclosure are described above. The present disclosure is not limited to specific embodiments. Various modifications and changes can be made within the scope of the disclosure described in the claims.

What is claimed is:

1. An electronic apparatus comprising:
    display means configured to display a first image;
    projecting means capable of displaying a virtual image of a second image at least in a first position near the display means or in a second position distant therefrom on a windshield of a vehicle by adjusting a focal length of the virtual image;

determining means configured to determine whether the virtual image of the second image is to be displayed in the first position or in the second position;

adjusting means configured to adjust the focal length of the virtual image in the projecting means on the basis of the determination by the determining means; and, cooperation determining means configured to determine whether the projecting means is to cooperate with the display means on the basis of correlation between the first image and the second image, wherein the first image and the second image have correlation with each other when at least part of the first image is common to the second image; and, wherein the adjusting means adjusts the focal length of the virtual image when it is determined that the projecting means is to cooperate.

2. The electronic apparatus according to claim 1, wherein the determination by the determining means is based on a running state of the vehicle.

3. The electronic apparatus according to claim 2, wherein the determining means determines that the virtual image is to be displayed in the first position when the vehicle is at a standstill and determines that the virtual image is to be displayed in the second position when the vehicle is moving.

4. The electronic apparatus according to claim 1, wherein the at least part of the first image common to the second image comprises traffic information.

5. The electronic apparatus according to claim 1, wherein the determining means determines that the virtual image is to be displayed in the first position when the first image has a content relating to arrival at a destination.

6. The electronic apparatus according to claim 1, wherein the determining means determines that the virtual image is to be displayed in the second position when the first image has a content relating to guidance on a next intersection.

7. The electronic apparatus according to claim 1, wherein the determining means determines that the virtual image is to be displayed in the first position when the first image has a content relating to information of an obtained image of surroundings of the vehicle.

8. The electronic apparatus according to claim 7, wherein the second image is a warning about an obstacle around the vehicle when the first image has the content relating to information on the obtained image of surroundings of the vehicle.

9. The electronic apparatus according to claim 1, wherein the display means is attached to an instrument panel in front of a driver's seat.

10. The electronic apparatus of claim 1, wherein the adjusting means adjusts the focal length of the virtual image by moving a position of a prism in the projecting means.

11. The electronic apparatus of claim 1, wherein the projecting means is a single optical projection system actuatable to display the virtual image of the second image at least in the first position near the display means or in the second position distant therefrom on the windshield of the vehicle by adjusting the focal length of the virtual image.

12. The electronic apparatus according to claim 1, wherein the adjusting means adjusts the focal length of the virtual image in the projecting means in proportion to a speed of the vehicle determined by the determining means.

13. The electronic apparatus according to claim 1, wherein when the cooperation determining means determines the projecting means is to cooperate with the display means, the projecting means displays a virtual image of the second image comprised of exaggerated content of the first image.

14. The electronic apparatus according to claim 1, wherein when the cooperation determining means determines the projecting means is to cooperate with the display means, the projecting means displays a virtual image of the second image comprised of supplementary information for a content of the first image.

15. The electronic apparatus of claim 1, wherein when it is determined by the determining means that a running state of the vehicle changes from vehicle standstill, at least part of the first image displayed on the display means is displayed by the projecting means as at least part of the virtual image of the second image.

16. An electronic apparatus comprising:

display means configured to display a first image;

projecting means capable of displaying a virtual image of a second image at least in a first position near the display means or in a second position distant therefrom on a windshield of a vehicle by adjusting a focal length of the virtual image;

determining means configured to determine whether the virtual image of the second image is to be displayed in the first position or in the second position;

adjusting means configured to adjust the focal length of the virtual image in the projecting means on the basis of the determination by the determining means; and, cooperation determining means configured to determine whether the projecting means is to cooperate with the display means, wherein the adjusting means adjusts the focal length of the virtual image when it is determined that the projecting means is to cooperate;

wherein the adjusting means adjusts the focal length of the virtual image in the projecting means in proportion to a distance to arrival at a destination determined by the determining means; and, wherein when it is determined by the determining means that the vehicle has arrived at the destination, information about the destination is displayed by the display means as at least part of the first image.

17. An electronic apparatus comprising:

display means configured to display a first image;

projecting means capable of displaying a virtual image of a second image at least in a first position near the display means or in a second position distant therefrom on a windshield of a vehicle by adjusting a focal length of the virtual image;

determining means configured to determine whether the virtual image of the second image is to be displayed in the first position or in the second position;

adjusting means configured to adjust the focal length of the virtual image in the projecting means on the basis of the determination by the determining means; and, cooperation determining means configured to determine whether the projecting means is to cooperate with the display means, wherein the adjusting means adjusts the focal length of the virtual image when it is determined that the projecting means is to cooperate;

wherein the adjusting means adjusts the focal length of the virtual image in the projecting means in proportion to a distance to arrival at a destination determined by the determining means; and, wherein when it is determined by the determining means that a running state of the vehicle changes from vehicle standstill, at least part of the first image displayed on the display means is displayed by the projecting means as the virtual image of the second image.

* * * * *